(12) United States Patent
Orlinskiy

(10) Patent No.: US 10,962,192 B2
(45) Date of Patent: Mar. 30, 2021

(54) ILLUMINATION DEVICE FOR A MOTOR VEHICLE

(71) Applicant: Bayerische Motoren Werke Aktiengesellschaft, Munich (DE)

(72) Inventor: Victor Orlinskiy, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/966,619

(22) PCT Filed: Jan. 14, 2019

(86) PCT No.: PCT/EP2019/050735
§ 371 (c)(1),
(2) Date: Jul. 31, 2020

(87) PCT Pub. No.: WO2019/149507
PCT Pub. Date: Aug. 8, 2019

(65) Prior Publication Data
US 2021/0025561 A1    Jan. 28, 2021

(30) Foreign Application Priority Data
Feb. 1, 2018   (DE) .................... 10 2018 201 533.3

(51) Int. Cl.
| | |
|---|---|
| *F21S 41/675* | (2018.01) |
| *F21S 41/176* | (2018.01) |
| *F21S 41/663* | (2018.01) |
| *B60Q 1/04* | (2006.01) |
| *F21S 41/13* | (2018.01) |
| *F21W 102/13* | (2018.01) |

(52) U.S. Cl.
CPC .............. *F21S 41/675* (2018.01); *B60Q 1/04* (2013.01); *F21S 41/13* (2018.01); *F21S 41/176* (2018.01);
(Continued)

(58) Field of Classification Search
CPC ...... F21S 41/675; F21S 41/663; F21S 41/176; F21S 41/13; B60Q 1/04
(Continued)

(56) References Cited

U.S. PATENT DOCUMENTS

| | | |
|---|---|---|
| 2014/0042325 A1 | 2/2014 | Yamamura |
| 2015/0016135 A1 | 1/2015 | Erdl et al. |

(Continued)

FOREIGN PATENT DOCUMENTS

| | | |
|---|---|---|
| DE | 10 2012 205 437 A1 | 10/2013 |
| DE | 10 2014 221 389 A1 | 4/2016 |

(Continued)

OTHER PUBLICATIONS

International Search Report (PCT/ISA/210) issued in PCT Application No. PCT/EP2019/050735 dated May 20, 2019 with English translation (six pages).

(Continued)

*Primary Examiner* — Bryon T Gyllstrom
(74) *Attorney, Agent, or Firm* — Crowell & Moring LLP

(57) ABSTRACT

An illumination device for a motor vehicle includes a first light source and a scanner, wherein, in the switched-on state of the first light source, light coming from same is incident upon the scanner and the scanner performs a scanning movement, by which the beam path of the light from the first light source is modified after passing via the scanner and a moving first light spot is thereby generated, with which a first lighting function is provided, which represents an illumination of a surrounding area of the motor vehicle with visible light. A conversion element is arranged in the beam path of the light from the first light source after passing via the scanner, which converts the light that is incident upon the element into white light. One or more second light sources are provided, wherein, in the switched-on state of a respec- (Continued)

tive second light source, light coming from same is incident upon the scanner and the scanner performs a scanning movement, by which the beam path of the light from the respective second light source is modified after passing via the scanner, without encountering a conversion element provided in the illumination device, and a moving second light spot is thereby generated, with which a respective second lighting function is provided.

15 Claims, 1 Drawing Sheet

(52) U.S. Cl.
CPC ........ *F21S 41/663* (2018.01); *F21W 2102/13* (2018.01)

(58) Field of Classification Search
USPC .......................................................... 362/510
See application file for complete search history.

(56) References Cited

U.S. PATENT DOCUMENTS

| | | | |
|---|---|---|---|
| 2015/0369437 A1 | 12/2015 | Reinprecht et al. | |
| 2017/0113599 A1* | 4/2017 | Park | B60Q 1/085 |
| 2018/0126898 A1* | 5/2018 | Weber | B60Q 1/26 |
| 2018/0147978 A1* | 5/2018 | Reisinger | B60Q 1/085 |
| 2019/0384054 A1* | 12/2019 | Mukojima | F21S 41/147 |
| 2020/0072433 A1* | 3/2020 | Scoville | F21S 41/255 |
| 2020/0198525 A1* | 6/2020 | Mueller | H05B 45/10 |
| 2020/0348689 A1* | 11/2020 | McEnroe | G05D 1/0276 |
| 2020/0393106 A1* | 12/2020 | Bursy | F21S 41/285 |

FOREIGN PATENT DOCUMENTS

| | | |
|---|---|---|
| DE | 10 2016 006 798 A1 | 12/2017 |
| EP | 3 216 652 A1 | 9/2017 |
| JP | 2015-231778 A | 12/2015 |
| JP | 2016-18668 A | 2/2016 |
| WO | WO 2013/051623 A1 | 4/2013 |
| WO | WO 2014/12131 A1 | 8/2014 |

OTHER PUBLICATIONS

German-language Written Opinion (PCT/ISA/237) issued in PCT Application No. PCT/EP2019/050735 dated May 20, 2019 (six pages).

German-language Search Report issued in German Application No. 10 2018 201 533.3 dated Nov. 8, 2018 with partial English translation (12 pages).

* cited by examiner

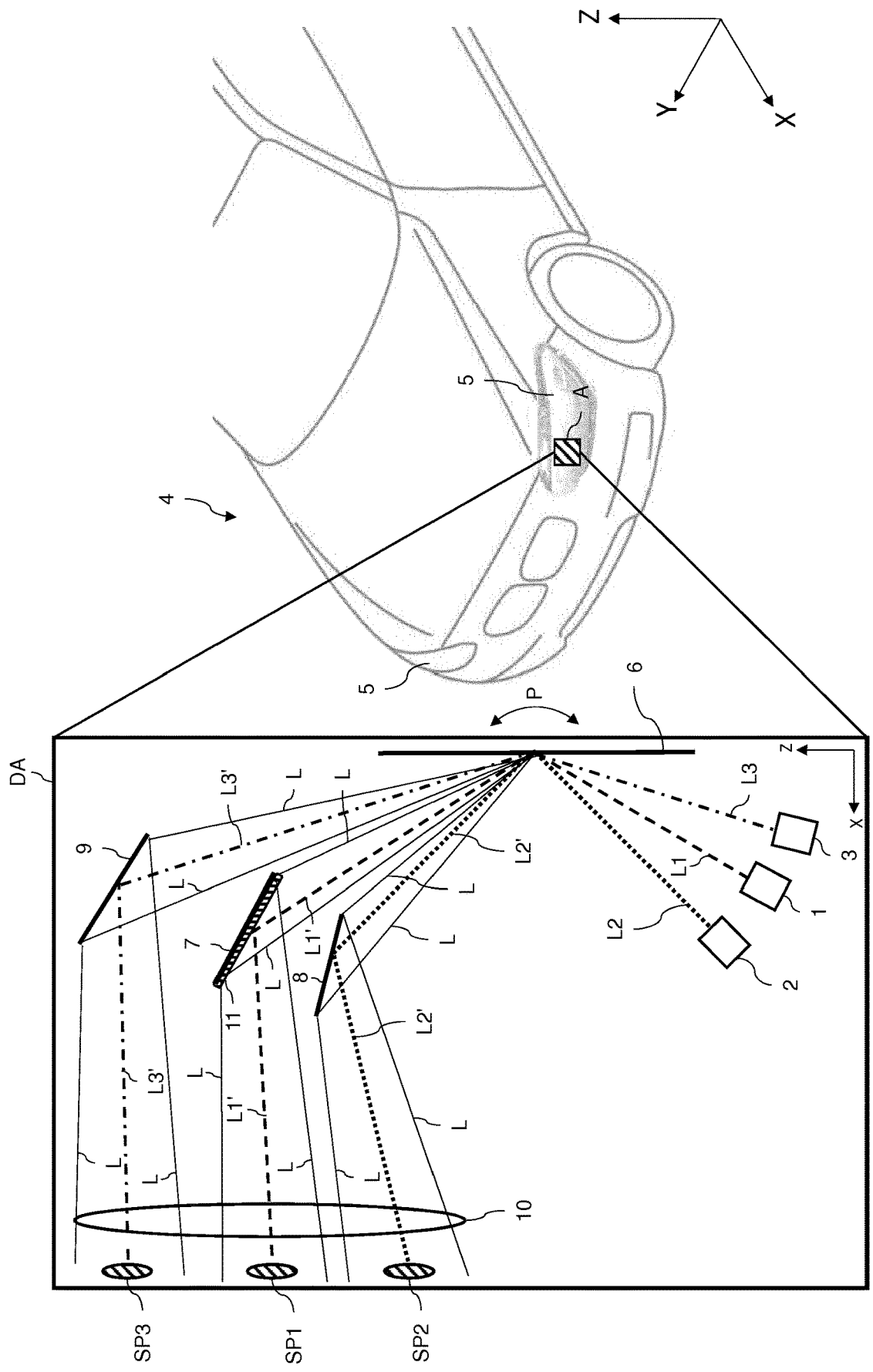

ILLUMINATION DEVICE FOR A MOTOR VEHICLE

BACKGROUND AND SUMMARY OF THE INVENTION

The invention relates to an illumination device for a motor vehicle and to a corresponding motor vehicle.

Scanning motor vehicle illumination devices having a scanner that produces a moving light spot by deflecting a light beam by means of a scanning movement are known from the prior art. In this way, various types of light distributions, such as for example low beam and high beam, can be generated. The movement of the light spot is so fast here that it is not perceivable by the human eye.

To produce low beam and high beam, conversion elements are generally mounted in scanning illumination devices in order to convert light that is generated in the illumination device and is generally monochromatic into white light. The use of such a conversion element produces a relatively unsharp projection, meaning that the illumination device is not suitable for other light functions outside low beam and high beam.

It is the object of the invention to provide a scanning illumination device for a motor vehicle with which a plurality of different light functions are provided in a simple manner.

This object is achieved by the illumination device according to the claimed invention.

The illumination device according to the invention is provided for a motor vehicle, such as a passenger vehicle and possibly also a truck. Where the following text and in particular the claims describe interactions between the illumination device and the motor vehicle or components of the motor vehicle, this should always be understood to mean that the interaction occurs after arrangement or installation of the illumination device in the motor vehicle. The components of the illumination device that have a corresponding interaction with the motor vehicle or the components of the motor vehicle are consequently configured such that the interaction is brought about after arrangement or installation of the illumination device in the motor vehicle.

The illumination device according to the invention comprises a first light source and a scanner, wherein, in the switched-on state of the first light source, light coming from the latter is incident on the scanner and the scanner performs a scanning movement by way of which the beam path of the light from the first light source is varied after passing the scanner, thus producing a moving first light spot with which a first light function is provided that brings about illumination of a region in the environment of the motor vehicle with visible light. In this case, a conversion element that converts light that is incident thereon to white light is arranged in the beam path of the light of the first light source after passing the scanner.

The illumination device according to the invention is characterized in that, in addition to the first light source, one or more second light sources are provided, wherein, in the switched-on state of a respective second light source, light coming from the latter is incident on the scanner and the scanner performs a scanning movement by way of which the beam path of the light from the respective second light source is varied after passing the scanner without being incident on a conversion element provided in the illumination device. In this way, a moving second light spot with which a respective second light function is provided is produced for the respective second light source. In other words, one or more second light functions that differ from the first light function are made possible by the illumination device. It is ensured here that the second light functions use no conversion element in the beam path downstream of the scanner and consequently also do not use the conversion element that is provided in the illumination device, which makes sharper light spots possible.

In one variant of the illumination device according to the invention, a corresponding second light function can be switched on only if the first light function has been switched off. It is likewise possible that at least some of the second light functions and the first light function can be switched on at the same time.

The illumination device according to the invention has the advantage that a plurality of light functions are made possible using a single scanner, wherein a conversion element is used only for one light function. The other light functions do not require a conversion element and therefore make sharp projection of a corresponding light spot possible to realize particular light distributions. The first light source preferably emits monochromatic light. Depending on the design, a respective second light source can emit monochromatic lights or colored light and possibly also white light.

In a particularly preferred embodiment, the illumination device according to the invention comprises a front headlight or it is a front headlight, wherein the illumination device is configured to produce at least a portion of a low beam distribution and/or high beam distribution as the first light function.

In a further preferred configuration, the first light source and/or at least one and preferably all second light sources comprise a laser light source made of one or more laser diodes. It is possible hereby to achieve high luminances for the corresponding light functions.

In a further preferred variant, the scanner that is installed in the illumination device according to the invention is a vector scanner having a variable scanning speed and a variable scanning pattern for moving the first and each second light spot. In this way, different forms of light distributions can be generated in a simple manner. In particular, a light-dark boundary can be generated for example in a low beam distribution by way of a corresponding movement of the vector scanner.

In a further preferred variant, the range of at least one second light function (that is to say the maximum distance reached by the light of the corresponding light spot from the illumination device) is smaller than the range of the first light function. Depending on the configuration, the light distribution of the second light function can overlap with the light distribution of the first light function, or both light distributions can be spatially disjunct with respect to one another.

In a further configuration, a second light function (that is to say the second light function or one of the plurality of second light functions) is designed such that it represents the generation of a visible graphic on the ground in the environment of the motor vehicle. The term "graphic" should here be understood to have a broad meaning. In particular, the graphic can include one or more pictograms and/or possibly text. Alternatively or additionally, the graphic can comprise a specified structure or a specified pattern on the ground in the environment of the motor vehicle. In particular, it is possible using the second light function to generate a graphic in the near field of the motor vehicle at a distance of 30 m or less from the illumination device.

In a further preferred configuration, a second light function (that is to say the second light function or one of a plurality of second light functions) represents the generation of a light distribution in a region in the environment of the motor vehicle in the non-visible wavelength spectrum. Non-visible here means that the light is not perceivable by the human eye. The non-visible wavelength spectrum of the light of the second light function preferably lies in the infrared range and with particular preference in the near infrared range (that is to say in the wavelength spectrum of 780 nm to 3 μm). This light function can be used, for example, in combination with a suitable evaluation unit to ascertain the distance of objects from the motor vehicle. In particular, it is possible by way of one or more cameras that operate in the corresponding non-visible spectrum of the second light function to capture the light distribution of the second light function and to ascertain herefrom the distance from objects in a manner known per se, for example based on the propagation time of the light from the illumination device to the camera or via a distortion of the non-visible light distribution.

In a position of the conversion element in which it is positioned in the switched-on state of the first light source and at least of a second light source, the beam path of the light of the at least one second light source and in particular of all second light sources deviates, in a further variant of the illumination device according to the invention, from the beam path of the light of the first light source after passing the scanner in a manner such that the beam path of the light of the at least one second light source is not incident on the conversion element. In other words, by suitably separating the beam paths, it is ensured that the light of at least one second light source is not incident on the conversion element. With this variant, embodiments can be realized in which the conversion element is arranged rigidly in the illumination device.

In a further configuration of the illumination device according to the invention, the conversion element is positioned from one position in which it is positioned in the switched-on state of the first light source into a different position when at least one second light source and in particular each second light source is switched on, for example by way of an electromechanical actuator. Owing to the positioning into the other position, the beam path of the at least one second light source that would strike the conversion element in one position is no longer incident on the conversion element. With this variant, no conversion element is used for corresponding second light functions on account of a variably positionable conversion element.

In a further variant of the illumination device according to the invention, an optical device is provided that is arranged in the beam path of the light of the first and each second light source downstream of the scanner and by way of which the first and each second light spot are produced. Typically, said optical device is also referred to as a secondary optical unit. The optical device preferably comprises one or more optical components, in particular one or more reflectors and/or one or more lenses, wherein at least one of the components is located in the beam path of the light both of the first and of each second light source. In this way, one or more components can be used at the same time by a plurality of light sources.

In addition to the above-described illumination device, the invention relates to a motor vehicle that comprises one or more illumination devices according to the invention or preferred variants of said illumination devices.

BRIEF DESCRIPTION OF THE DRAWING

FIG. 1 is a schematic illustration of an embodiment of an illumination device according to the invention.

DETAILED DESCRIPTION OF THE DRAWING

FIG. 1 describes in detail below one exemplary embodiment of the invention. FIG. 1 shows, in the right-hand part, the front region of a motor vehicle 4, whose front headlights 5 in each case represent one embodiment of the illumination device according to the invention. FIG. 1 shows a Cartesian coordinate system having an X-axis, a Y-axis, and a Z-axis, wherein the ground on which the motor vehicle 4 is located is defined by the X-axis and the Y-axis, and the height direction of the motor vehicle is represented by the Z-axis. In the left-hand part of FIG. 1, a detail view DA of a hatched section A of the left-hand front headlight 5 is schematically reproduced. The detail view here represents a section through the front headlight parallel to the plane defined by the X- and Z-axis.

According to the detail view DA, the illumination device 5 includes three light sources 1, 2, 3, which are laser light sources. The laser light source 1 represents an embodiment of a first light source within the meaning of the claims. By contrast, the laser light sources 2 and 3 represent embodiments of second light sources within the meaning of the claims. The laser light source 1 emits monochromatic light in the form of blue laser light in the visible range. The laser light source 2 also emits laser light in the visible range, which, depending on the configuration, can be monochromatic light or possibly colored light or white light, which can be generated using a suitable RGB laser. By contrast, the laser light source 3 generates non-visible light in the near infrared range. The light beam emitted by the light source 1 is schematically reproduced in FIG. 1 by way of the dashed line L1. By contrast, the light beam emitted by the light source 2 is represented by the dotted line L2, and the light beam emitted by the light source 3 is represented by the dot-dashed line L3.

The illumination device 5 comprises a scanner 6 in the form of a movable micromirror, which is realized to be highly compact in the form of a MEMS component (MEMS=microelectromechanical system). The scanner is an electrically controllable vector scanner, the micromirror of which is pivotable both about an axis that is perpendicular to the sheet plane of FIG. 1 (indicated by the double-headed arrow P) and about an axis that is parallel to the sheet plane of FIG. 1 and extends along the plane of the micromirror. The light beams L1 to L3 of the respective laser light sources 1 to 3 which are incident on the scanner 6 are deflected by the latter such that moving light rays or moving light beams result from said light beams, wherein corresponding light rays are denoted in FIG. 1 with L1', L2' and L3'. The light ray L1' results from the light ray L1, the light ray L2' results from the light ray L2, and the light ray L3' results from the light ray L3. Analogously to the light beams L1, L2 and L3, the light ray L1' is depicted as a dashed line, the light ray L2' as a dotted line, and the light ray L3' as a dot-dashed line. The light rays L1' to L3' represent beam profiles in the zero position of the micromirror of the scanner 6 reproduced in FIG. 1. Owing to a scanning movement of the scanner, the light rays L1' to L3' are tilted, wherein the resulting angle ranges in which the respective light bundles L1' to L3' can travel are delimited by thin solid lines L.

According to the embodiment of FIG. 1, three reflectors 7, 8, and 9 and an exit lens 10 are provided in the beam path after passing the scanner 6. The reflectors 7, 8 and 9 and the lens 10 represent an embodiment of an optical device within the meaning of the claims. The reflectors 8 and 9 perform a pure reflection of the light rays that are incident thereon, whereas a conversion element 11 is additionally positioned on the reflector 7, which conversion element 11 effects a conversion of the reflected light into white light. The conversion element consists of a conversion material that is known per se. For example, in the case of a blue/violet laser light source with an emission wavelength of 450 nm/405 nm, a phosphor conversion layer made of nitride phosphor or oxide nitride phosphor or cerium-doped YAG phosphor is used.

Only the light beam L1' of the light source 1 is deflected by the reflector 7 having a conversion element 11 arranged thereon. Only the light beam L2' of the light source 2 is deflected via the reflector 8. Only the light beam L3' of the light source 3 is deflected via the reflector 9. The light beams resulting from the reflection at the respective reflectors 7 to 9 are all incident on a common exit lens 10, which generates, in front of the motor vehicle, a light spot SP1 from the light beam L1', a light spot SP2 from the light beam L2', and a light spot SP3 from the light beam L3'. Using the scanning movement of the scanner 6, a rapid movement of these light spots is brought about, which is not perceivable by the human eye. In this way, three different light distributions are generated by the corresponding light spots SP1 to SP3.

The light spot SP1 is used to generate a low beam distribution and possibly also a high beam distribution. Since low beam and high beam are white light, the conversion element 11 in the beam path of the light beam L1' is necessary. The movement of the scanner 6 is adapted depending on whether it is low beam or high beam that is generated. In contrast to the light spot SP1, the light spot SP2 is used to provide a light distribution with a smaller range than the low beam or the high beam. This light distribution lies in the near field of the motor vehicle at a distance of at most 30 m from the front end thereof. In the embodiment described here, a graphic on the ground of the motor vehicle is generated by the light spot SP2, which can be achieved by corresponding actuation and an associated movement of the scanner 6. At the time when a corresponding graphic is shown, the light source 1 and possibly also a light source 3 are switched off.

Using the graphic generated via the light spot SP2, corresponding pictograms or possibly even text can be reproduced on the ground in front of the motor vehicle so as to display information for the driver of the motor vehicle or for other road users. For example, it is possible using the graphic to output a warning to warn that the distance from a vehicle driving in front lies below a specified threshold. If necessary, it is also possible to project a specified structure or a specified pattern on the ground in front of the motor vehicle as the graphic. Since the light of the light source 2 does not pass the conversion element 11, the graphic can be reproduced in a specified color or as a mixture of a plurality of colors. In this way, the attention of the driver of the motor vehicle 4 or of other road users is directed to the graphic.

As already mentioned, the laser light source 3 produces non-visible laser light in the near infrared range. Owing to the spot SP3, a light distribution that is not perceivable by the driver of the motor vehicle or by other road users is generated in front of the motor vehicle. In the embodiment described here, said light distribution is used to detect the distance from objects in front of the motor vehicle. To this end, a camera (not illustrated) is installed in the front of the motor vehicle, which camera captures an image of the environment in front of the motor vehicle in the near infrared range. Said image contains information relating to the light distribution generated with the spot SP3. In a manner known per se, said information can be evaluated to ascertain the distance of the motor vehicle 4 from other objects. In one variant, for example a TOF camera (TOF=time of flight) can be used to ascertain a distance from the time period between the light spot SP3 being emitted and it being received in the camera. It is likewise possible that the light spot SP3 generates a structured light distribution, wherein three-dimensional information can be extracted by evaluating the distortion of said structured light distribution and the distance from objects in front of the motor vehicle can be determined thereby.

In the embodiment of FIG. 1, the conversion element 11 and the reflectors 7 to 9 are installed rigidly in the illumination device. This ensures by way of a suitably selected beam path of the light beams L1' to L3' that only the light beam L1' passes the conversion element 11. In an alternative embodiment, it is also possible for the beam profiles of the individual laser light sources to overlap one another or to correspond to one another. In this case, the conversion element is able to be folded. Said folding can be achieved with a suitable electromechanical apparatus. In the non-folded position, only the light source 1 is switched on and the light ray travels via the conversion element 11. In the folded position, at least one of the light sources 2 and 3 is switched on and the light source 1 is switched off. Due to the folding of the conversion element, the light rays of the light sources 2 or 3 do not travel via said element.

The embodiments of the invention described above have a number of advantages. In particular, further light functions are integrated, in addition to the light function of a low beam and high beam, in a simple manner in a motor vehicle illumination device by using the same scanner for the light sources of the further light functions and furthermore by ensuring that the further light functions do not use the conversion element, which is provided to produce white light for the low beam and high beam. In this way, a compact construction of the illumination device can be achieved, while simultaneously realizing light functions with sharp light spots. Moreover, at least part of the optical device that generates the corresponding light spots for the individual light sources can be used together for the light beams of all light sources, as a result of which a further reduction in the size of the illumination device is achieved.

LIST OF REFERENCE SIGNS

1, 2, 3 Light sources
4 Motor vehicle
5 Front headlight
6 Scanner
7, 8, 9 Reflectors
10 Lens
11 Conversion element
A Detail of the illumination device
DA Detail view
L1, L2, L3, L1', L2', L3' Light beams
L Delimitations of angle ranges
SP1, SP2, SP3 Light spots
P Double-headed arrow
X, Y, Z Coordinates of a Cartesian coordinate system

What is claimed is:

1. An illumination device for a motor vehicle, comprising:
a first light source;
a scanner, wherein, in a switched-on state of the first light source, light coming from the first light source is incident on the scanner and the scanner performs a scanning movement by way of which a beam path of the light from the first light source is varied after passing the scanner, thus producing a moving first light spot with which a first light function is provided that brings about illumination of a region in an environment of the motor vehicle with visible light, wherein a conversion element that converts light that is incident thereon to white light is arranged in the beam path of the light of the first light source after passing the scanner; and
one or more second light sources, wherein, in a switched-on state of a respective second light source, light coming from the respective second light source is incident on the scanner and the scanner performs a scanning movement by way of which the beam path of the light from the respective second light source is varied after passing the scanner without being incident on a conversion element provided in the illumination device, thus providing a moving second light spot with which a respective second light function is provided.

2. The illumination device according to claim 1, wherein the illumination device comprises a front headlight for a motor vehicle, and
the illumination device is configured to produce at least a portion of a low beam distribution and/or high beam distribution as the first light function.

3. The illumination device according to claim 1, wherein the first light source and/or at least one second light source comprises a laser light source.

4. The illumination device according to claim 1, wherein the scanner is a vector scanner having a variable scanning speed and a variable scanning pattern for moving the first and each second light spot.

5. The illumination device according to claim 1, wherein a range of at least one second light function is smaller than a range of the first light function.

6. The illumination device according to claim 1, wherein a second light function represents a generation of a visible graphic on the ground in an environment of the motor vehicle.

7. The illumination device according to claim 1, wherein a second light function represents a generation of a light distribution in a region in the environment of the motor vehicle in a non-visible wavelength spectrum.

8. The illumination device according to claim 7, wherein the non-visible wavelength spectrum of the light of the second light function lies in an infrared range.

9. The illumination device according to claim 7, wherein the non-visible wavelength spectrum of the light of the second light function lies in a near infrared range.

10. The illumination device according to claim 1, wherein in a position of the conversion element in which the conversion element is positioned in the switched-on state of the first light source and at least of a second light source, the beam path of the light of the at least one second light source deviates from the beam path of the light of the first light source after passing the scanner in a manner such that the beam path of the light of the at least one second light source is not incident on the conversion element.

11. The illumination device according to claim 1, wherein the conversion element is positioned from one position in which the conversion element is positioned in the switched-on state of the first light source into a different position when at least one second light source is switched on, wherein the positioning into the other position ensures that the beam path of the at least one second light source is no longer incident on the conversion element.

12. The illumination device according to claim 1, further comprising:
an optical device which is arranged in the beam path of the light of the first and of each second light source downstream of the scanner by way of which the first and each second light spot is produced.

13. The illumination device according to claim 12, wherein
the optical device comprises one or more optical components, wherein at least one of the components is located in the beam path of the light both of the first and also of each second light source.

14. The illumination device according to claim 13, wherein
the one or more optical components comprise one or more reflectors and/or one or more lenses.

15. A motor vehicle, comprising one or more illumination devices according to claim 1.

* * * * *